(12) United States Patent
Papadopoulos et al.

(10) Patent No.: US 12,432,574 B2
(45) Date of Patent: Sep. 30, 2025

(54) DOPPLER SPREAD BASED BEAM MEASUREMENT AND REPORTING FOR HIGH SPEED MOBILITY

(71) Applicants: NTT DOCOMO, INC., Tokyo (JP); DOCOMO INNOVATIONS, INC., Palo Alto, CA (US)

(72) Inventors: Haralabos Papadopoulos, Tokyo (JP); Nadisanka Rupasinghe, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 384 days.

(21) Appl. No.: 17/756,889

(22) PCT Filed: Dec. 4, 2020

(86) PCT No.: PCT/US2020/063388
§ 371 (c)(1),
(2) Date: Jun. 3, 2022

(87) PCT Pub. No.: WO2021/113695
PCT Pub. Date: Jun. 10, 2021

(65) Prior Publication Data
US 2023/0007927 A1    Jan. 12, 2023

Related U.S. Application Data

(60) Provisional application No. 62/944,637, filed on Dec. 6, 2019.

(51) Int. Cl.
*H04W 16/28* (2009.01)
*H04B 7/01* (2006.01)
(Continued)

(52) U.S. Cl.
CPC .............. *H04W 16/28* (2013.01); *H04B 7/01* (2013.01); *H04B 7/0617* (2013.01); *H04W 24/10* (2013.01)

(58) Field of Classification Search
CPC ........ H04W 16/28; H04W 24/10; H04B 7/01; H04B 7/0617
See application file for complete search history.

(56) References Cited

U.S. PATENT DOCUMENTS

| | | | | |
|---|---|---|---|---|
| 11,617,195 B2* | 3/2023 | Huang | .................. | H04L 5/0048 |
| | | | | 370/329 |
| 11,632,209 B2* | 4/2023 | Kwak | .................. | H04W 72/23 |
| | | | | 370/329 |

(Continued)

FOREIGN PATENT DOCUMENTS

| | | |
|---|---|---|
| JP | 2005-244991 A | 9/2005 |
| JP | 2016-502327 A | 1/2016 |
| WO | 2016140425 A1 | 9/2016 |

OTHER PUBLICATIONS

3GPP TSG RAN WG1 Meeting #96; R1-1903071 "Design and contents of PSCCH and PSFCH" Huawei, HiSilicon; Athens, Greece; Feb. 25-Mar. 1, 2019 (10 pages).

(Continued)

*Primary Examiner* — Blake J Rubin
(74) *Attorney, Agent, or Firm* — Osha Bergman Watanabe & Burton LLP

(57) ABSTRACT

A terminal is disclosed including a processor that measures for beam management: a Doppler spread or a coherence time associated with a beam and one or more reporting quantities. The terminal also includes a transceiver that reports the Doppler spread or the coherence time. In other aspects, a method for a terminal and a base station are also disclosed.

18 Claims, 11 Drawing Sheets

(51) Int. Cl.
*H04B 7/06* (2006.01)
*H04W 24/10* (2009.01)

(56) References Cited

U.S. PATENT DOCUMENTS

| | | | |
|---|---|---|---|
| 2015/0288425 | A1 | 10/2015 | Kim et al. |
| 2018/0041262 | A1 | 2/2018 | Kang et al. |
| 2018/0042028 | A1* | 2/2018 | Nam ................ H04L 5/0035 |
| 2018/0352526 | A1* | 12/2018 | Frenger ............ H04W 56/0035 |
| 2019/0132101 | A1* | 5/2019 | Priyanto ............ H04L 5/0053 |
| 2019/0245605 | A1* | 8/2019 | Islam ................ H04W 72/54 |
| 2019/0246394 | A1* | 8/2019 | Asplund ............ H04L 25/0202 |
| 2020/0014512 | A1* | 1/2020 | Ramadan ........... H04L 27/2602 |
| 2020/0077285 | A1* | 3/2020 | Yu .................. H04W 72/12 |
| 2020/0259692 | A1* | 8/2020 | Hadani .............. H04L 27/32 |
| 2021/0105739 | A1* | 4/2021 | Lin .................. H04W 72/0446 |
| 2021/0111779 | A1* | 4/2021 | Kundargi ........... H04W 80/02 |
| 2021/0143936 | A1* | 5/2021 | Zhang ............... H04W 76/15 |
| 2021/0320823 | A1* | 10/2021 | Ernström ............ H04L 25/0212 |
| 2022/0029676 | A1* | 1/2022 | Ramireddy .......... H04B 7/0626 |
| 2022/0038139 | A1* | 2/2022 | Eriksson Löwenmark ................ H04B 7/01 |
| 2022/0210765 | A1* | 6/2022 | Cao ................. H04L 5/0092 |
| 2022/0264615 | A1* | 8/2022 | Kang ................ H04B 7/024 |
| 2022/0330068 | A1* | 10/2022 | Yuan ................ H04B 7/063 |
| 2022/0399917 | A1* | 12/2022 | Shin ................. H04B 17/318 |

OTHER PUBLICATIONS

International Search Report issued in International Application No. PCT/US2020/063388, mailed Feb. 18, 2021 (4 pages).
Written Opinion issued in International Application No. PCT/US2020/063388; Dated Feb. 18, 2021 (11 pages).
3GPP TSG RAN WG1#99; R1-1912667 "Doppler spread analysis of high-speed train measurements at 5.2 GHZ" Fraunhofer IIS, Fraunhofer HHI; Reno, USA; Nov. 18-22, 2019 (6 pages).
3GPP TS 38.133 V16.1.0 "3rd Generation Partnership Project; Technical Specification Group Radio Access Network; NR; Requirements for support of radio resource management (Release 16)" Sep. 2019 (1043 pages).
3GPP TS 38.214 V15.7.0 "3rd Generation Partnership Project; Technical Specification Group Radio Access Network; NR; Physical layer procedures for data (Release 15)" Sep. 2019 (106 pages).
E. Dahlman et al. "5G NR; The Next Generation Wireless Access Technology" Oct. 15, 2020 (611 pages).
Office Action issued in the counterpart Japanese Patent Application No. 2022-533511, mailed on Jun. 27, 2023 (8 pages).
Huawei, HiSilicon; "Sidelink physical layer procedures for NR V2X"; 3GPP TSG RAN WG1 Meeting #96, R1-1901537; Athens, Greece; Feb. 25-Mar. 1, 2019 (18 pages).

* cited by examiner

FIG. 8

| $k_{i,j}^{(1)}$ | $p_{i,j}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

$n = 3 \text{ bits}$

FIG. 9

| UCI bit | Coherence time [us] |
|---------|---------------------|
| 00      | 10                  |
| 01      | 50                  |
| 10      | 100                 |
| 11      | 200                 |

DOPPLER SPREAD BASED BEAM MEASUREMENT AND REPORTING FOR HIGH SPEED MOBILITY

TECHNICAL FIELD

One or more embodiments disclosed herein relate to updating channel state information (CSI) with high frequency.

BACKGROUND ART

According to rapid variations in wireless channels of high-speed mobility scenarios, updating CSI with high frequency is necessary.

Higher CSI reporting frequency may lead to a high feedback overhead, and may affect user perceived throughput. In fact, the channel coherence time determines the approximate time, the wireless channel stays constant. On the other hand, channel coherence time is based on the Doppler spread of the channel which is due to the multipath propagation.

A Doppler analysis for a high speed train (HST) scenario from real measurements to understand behavior of wireless channel under high-speed mobility is discussed with reference to FIG. 1.

FIG. 1 shows Doppler-power spectrum over measurement time. Speed, BW, Train and Range of Doppler shift may be defined as follows:

Speed: 100 km/h-130 km/h; BW: 120 MHz; Train: Outdoor railway rooftop antenna; BS: 8-element dual-polarize array; and Range of Doppler shift: 450 Hz-(−400) Hz.

Doppler spread at a given time instance determines how long the estimated/tracked Doppler shift for that instance is valid.

FIG. 2 shows Doppler-power spectrum [1]. By considering information provided in [1], let us calculate channel coherence time for HST scenario. The largest possible spread ($\Delta f\_Max$) and the channel coherence time ($T\_c$) may be defined as follows:

The largest possible spread ($\Delta f\_Max$) 1200 Hz; and the channel coherence time $(T\_c) \approx 1/(\Delta f\_Max) = 830$ μs.

Based on above calculations following observations can be made: For HST of 100 km/h, it can be assumed that the channel stays constant for approx. 830 μs (observation (1)). Further, as captured in FIG. 2 and FIG. 3 by time instances marked as (1) and (2), Doppler shift and spread varies at different time instances (observation (2)). For HST scenarios>100 km/h, $T_c$ will be much shorter (observation (3)).

Before discussing how Doppler spread is associated with beams, NR beam management procedure for DL [2] will be quickly discussed.

FIG. 4 shows Synchronization signal (SS) burst set transmission. SS burst and SS burst period may be defined as follows:

SS burst: 5 ms; and SS burst period ($\in$\{5, 10, 20, 40, 80, 160\} ms).

As shown in FIG. 4, up to 64 SS blocks (SSB) can be transmitted within SS burst of 5 ms. SS burst set period is usually 20 ms. However, 5, 10, 40, 80, 160 ms are also feasible. At the UE, considering some criteria (discussed next), best beam is selected and reported to the gNB.

FIG. 5 shows UE measures and reports L1-RSRP of 4 candidate beams. As per 5G NR Rel. 15, L1-RSRP and L3-RSRP [2, 3, 4] of candidate beam(s) are measured and reported by UE. As per the agreements of 5G NR Rel. 16, in addition to L1-RSRP and L3-RSRP, L1-SINR measurement is also considered. The following set of RSs are considered for RSRP and SINR measurements:

Non zero power (NZP) CSI-RS; ZP-CSI-RS; and SSB.

In this type of beam selection, there is no information on how fast the wireless channel within the selected beam gets outdated. This is important especially for high speed mobility scenarios.

FIG. 6 shows an example of how Mean Doppler and Doppler spreads of beams depend on the propagation environment. In particular, FIG. 6 shows the reason for previous observation (2) (Further, as captured in FIG. 2 and FIG. 3 by time instances marked as (1) and (2), Doppler shift and spread varies at different time instances (observation (2))).

FIG. 6 also shows different spatial beams. As shown in FIG. 6, due to the scattering geometry associated with different spatial beams, mean Doppler and Doppler spread around the mean can be different for different spatial beams (observation (4)).

CITATION LIST

Non-Patent References

[Non-Patent Reference 1] 3GPP, RAN1 meeting #99, "Doppler spread analysis of high-speed train measurements at 5.2 GHz," Fraunhofer IIS/HHI

[Non-Patent Reference 2] Erik Dahlman, Stefan Parkvall, Johan Skold. "5G NR: The Next Generation Wireless Access Technology."

[Non-Patent Reference 3] 3GPP TS 38.214, "NR; Physical layer procedures for data (Release 15)"

[Non-Patent Reference 4] 3GPP TS 38.133, "NR; Requirements for support of radio resource management (Release 15)"

SUMMARY OF INVENTION

One or more embodiments provide a terminal that includes a processor that measures and reports for beam management: Doppler spread or coherence time associated with a beam and one or more reporting quantities; and a transceiver that reports the Doppler spread or the coherence time.

BRIEF DESCRIPTION OF DRAWINGS

FIG. 8 shows a n-bit(s) quantized version of the Doppler spread of a beam.

FIG. 9 shows an example of the n-bit(s) quantized version of the coherence time of a beam in Opt. 2 2.

DESCRIPTION OF EMBODIMENTS

Figure 1:
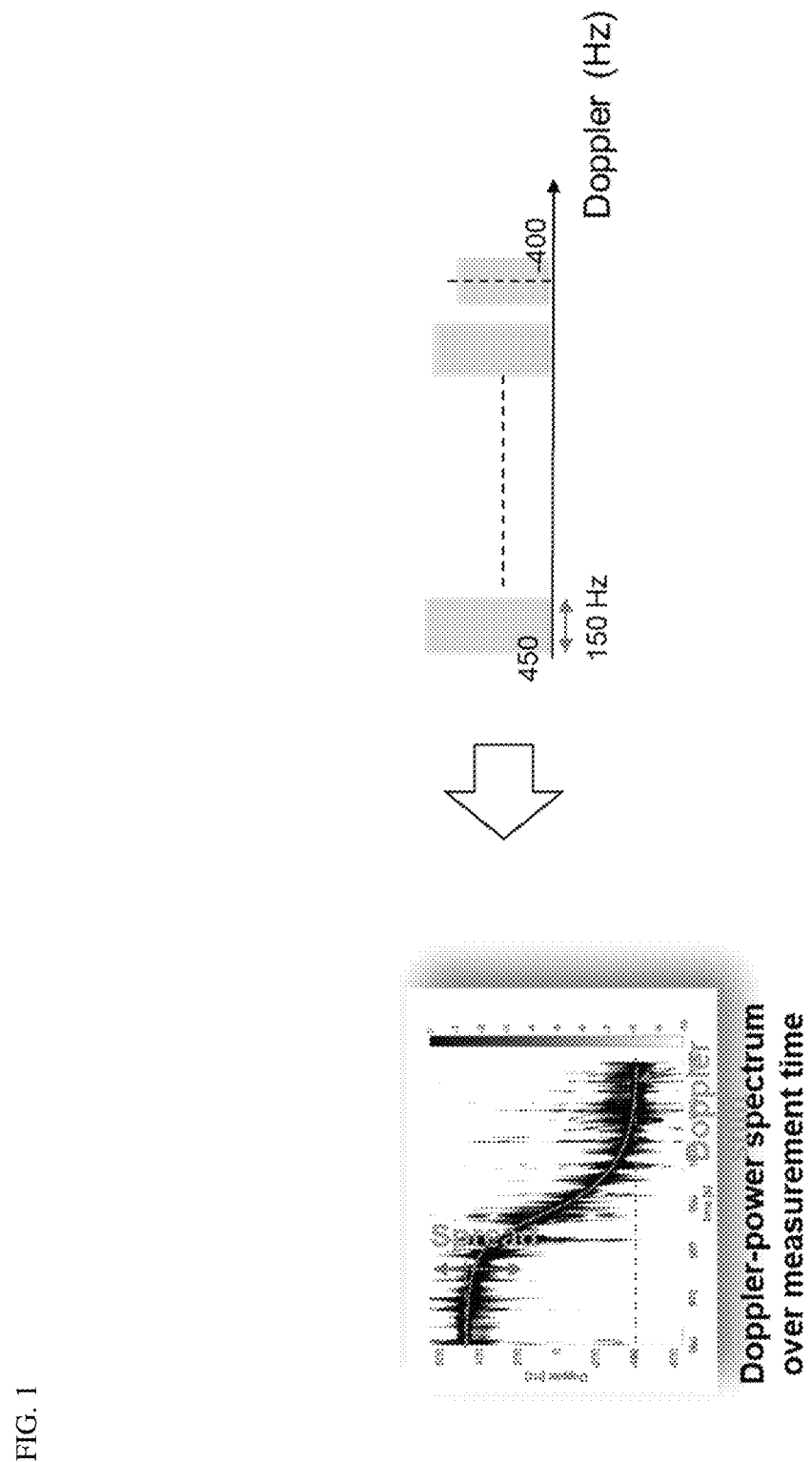
FIG. 1 shows Doppler-power spectrum over measurement time.
Figure 2:
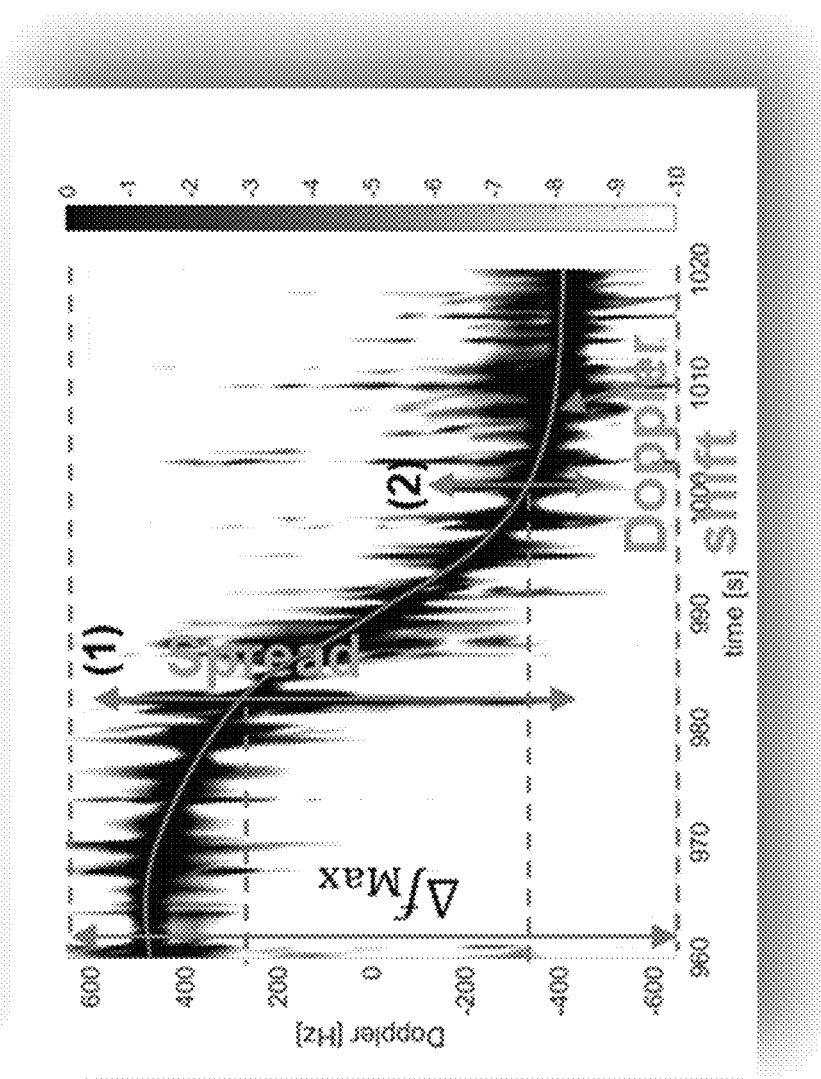
FIG. 2 shows Doppler-power spectrum [1].
Figure 3:
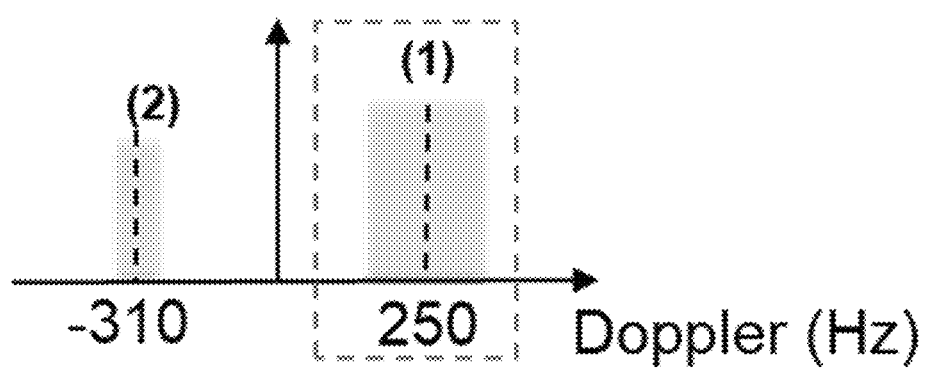
FIG. 3 shows Doppler shift and spread varies at different time instances.
Figure 4:
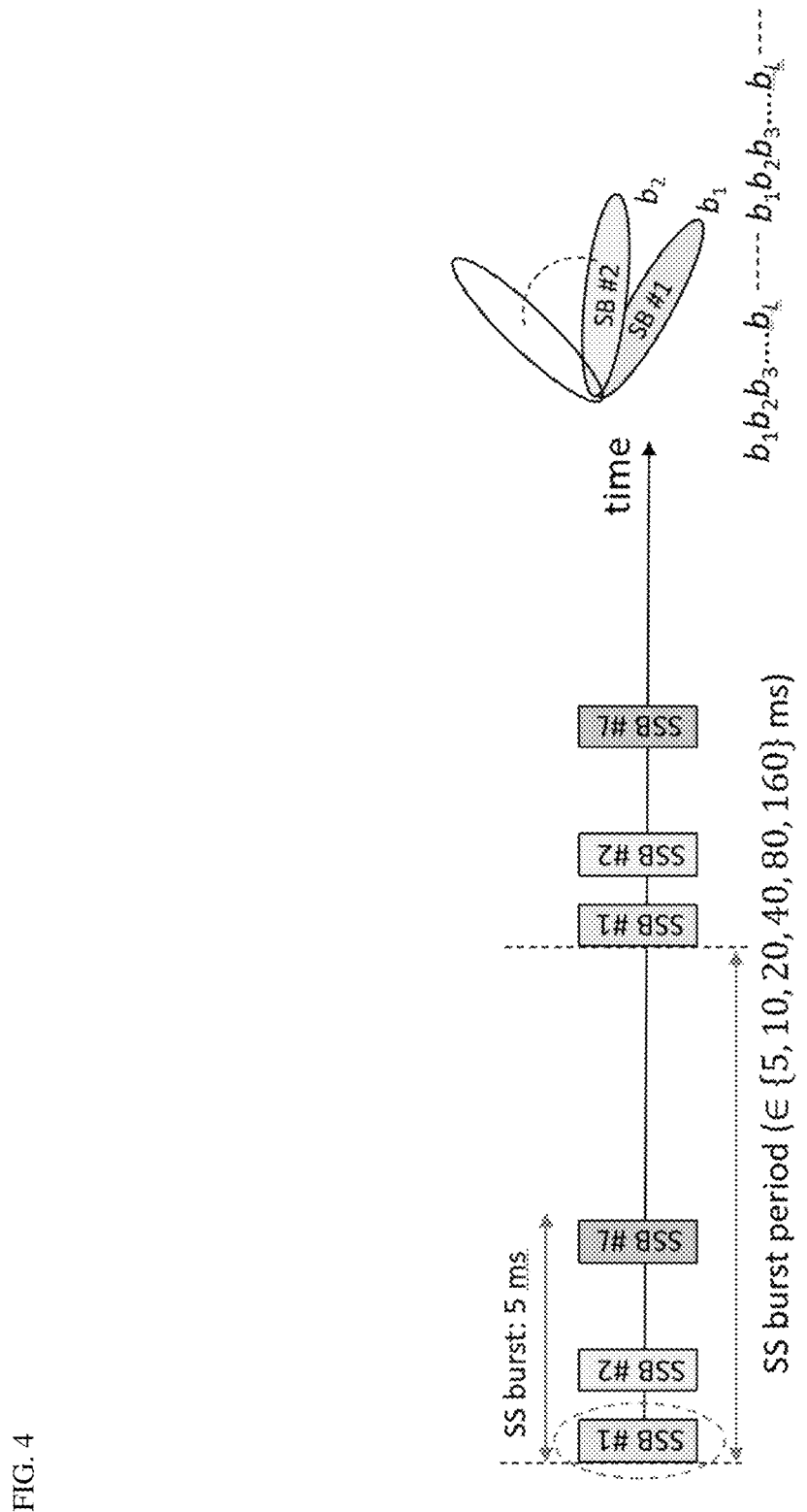
FIG. 4 shows Synchronization signal (SS) burst set transmission.
Figure 5:
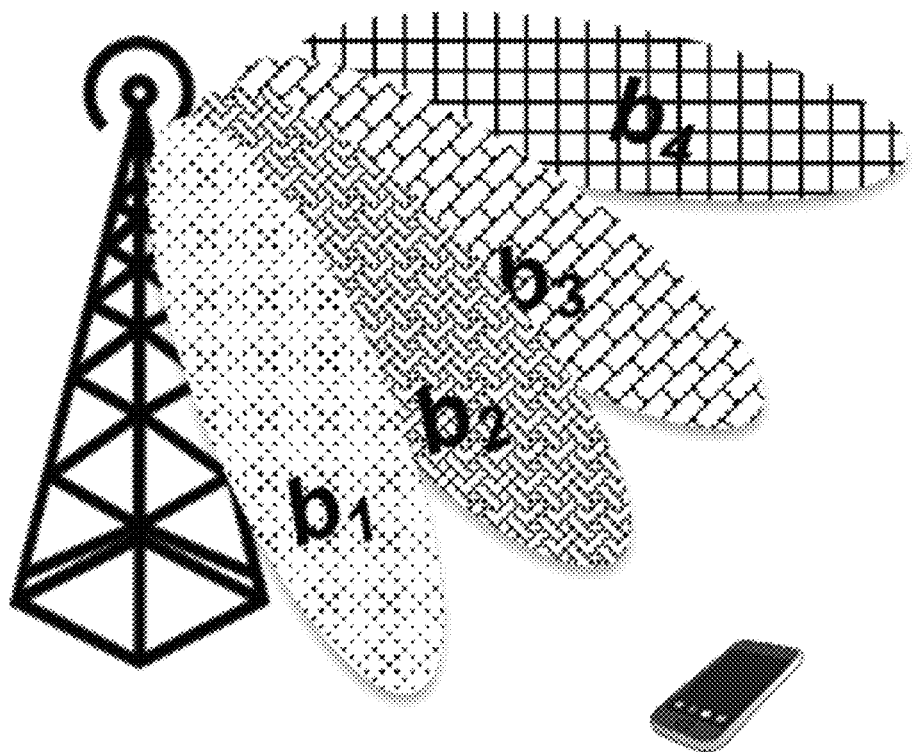
FIG. 5 shows UE measures and reports L1-RSRP of 4 candidate beams.
Figure 6:
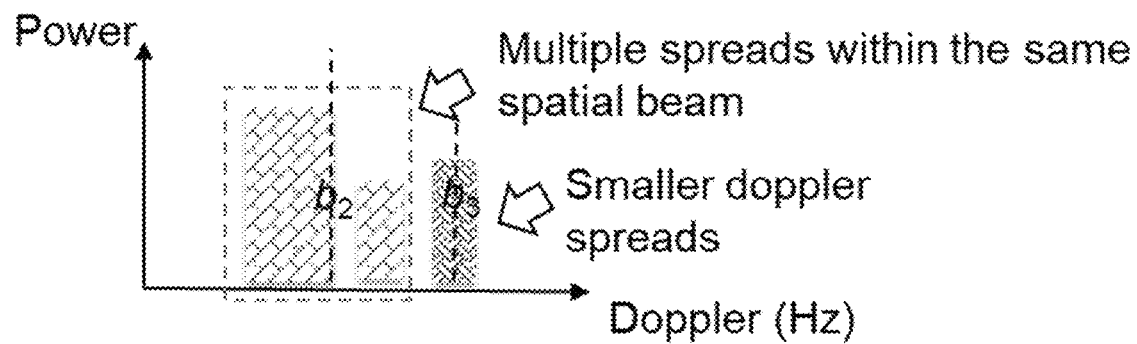
FIG. 6 shows Mean Doppler and Doppler spreads of beams depend on the propagation environment and also shows different spatial beams.
Figure 6:
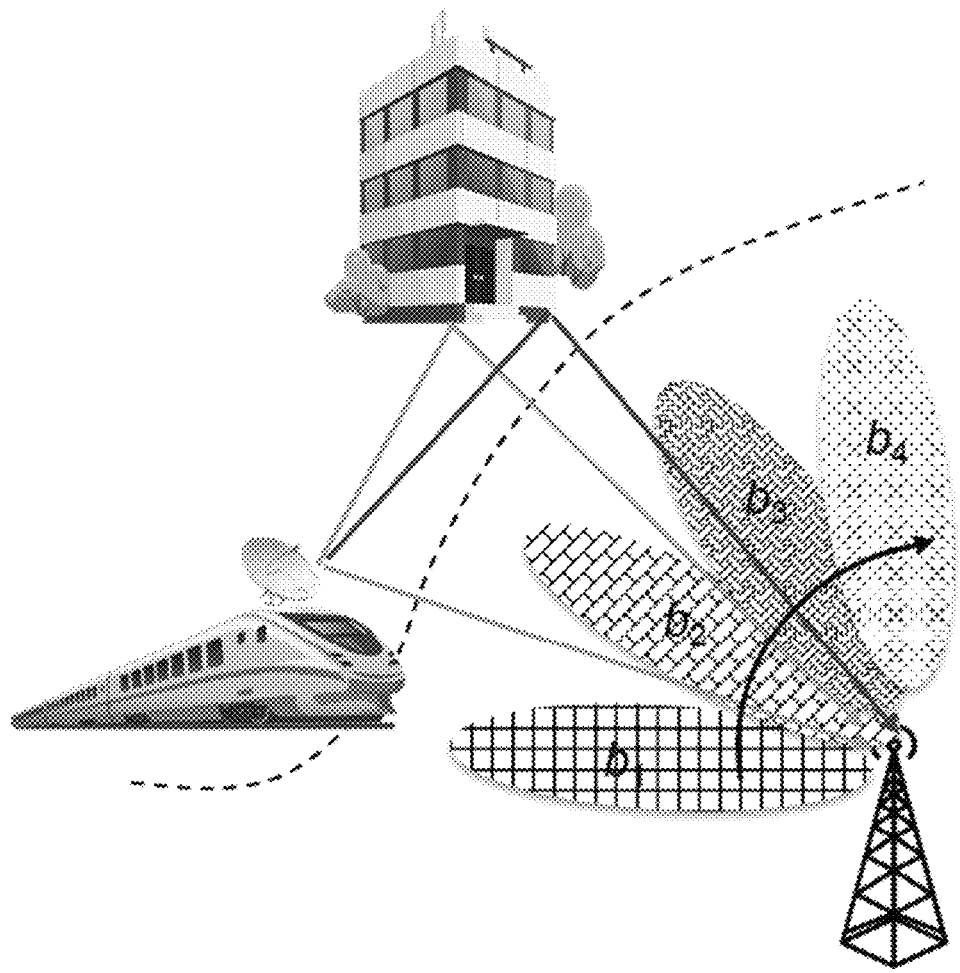

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 7:
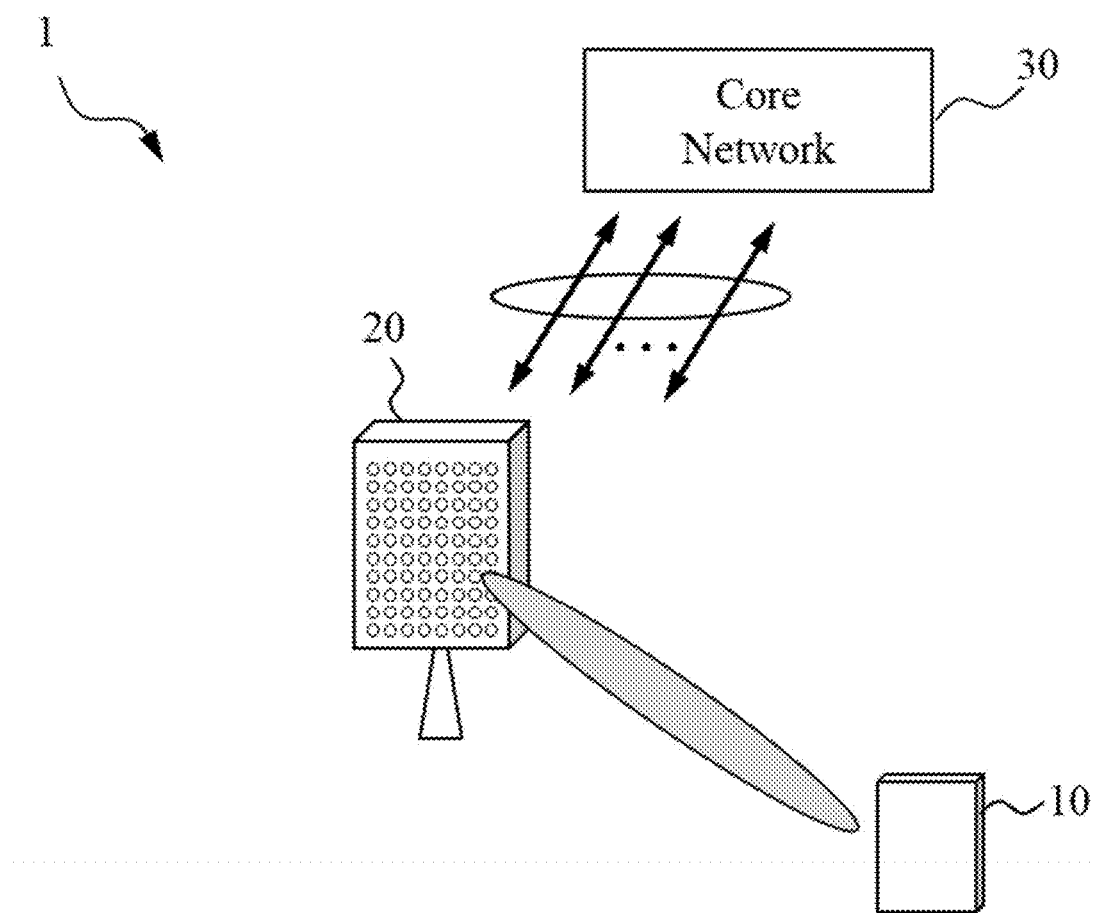
FIG. 7 shows a wireless communications system according to one or more embodiments.

FIG. 7 is a wireless communications system 1 according to one or more embodiments. The wireless communication system 1 includes a user equipment (UE) 10, a base station (BS) 20, and a core network 30. The wireless communication system 1 may be a New Radio (NR) system. The wireless communication system 1 is not limited to the specific configurations described herein and may be any type of wireless communication system such as an LTE/LTE-Advanced (LTE-A) system.

The BS 20 may communicate UL and DL signals with the UE 10 in a cell of the BS 20. The DL and UL signals may include control information and user data. The BS 20 may communicate DL and UL signals with the core network 30 through backhaul links 31. The BS 20 may be gNodeB (gNB).

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

The UE may be referred to as a terminal, a user terminal, or a mobile station.

Mean Doppler and Doppler spread around the mean can be different for different spatial beams. Hence, in addition to L1-RSRP/L3-RSRP/L1-SINR of beams for measurement/reporting, Doppler spread should also be considered.

Option 1 (Opt. 1) is that UE should measure and report following quantities for beam management purposes. In Option 1, one or more of the following quantities of each beam: L1-RSRP, L3-RSRP, L1-SINR. In Option 1, Doppler spread or coherence time associated with each beam. In addition to Doppler spread, UE measures/reports Doppler shift associated with each beam (Option 1.1 (Opt. 1.1)).

Option 2 (Opt. 2) is that using 1 bit in DCI, NW activates whether to measure and report Doppler spread of each beam in addition to L1-RSRP/L3-RSRP/L1-SINR quantities, e.g.: if 1: report Doppler; 0: Don't report Doppler.

Option 2.1 (Opt. 2.1) is that using 1 bit in higher layer signaling, NW activates whether to measure and report Doppler spread of each beam in addition to L1-RSRP/L3-RSRP/L1-RSRP.

Option 3 (Opt. 3): Doppler spread measurement/reporting is only necessary with one or more other measurements. The other measurements may be defined as follows:

Measurement/Reporting of Doppler is only necessary with L1-RSRP;

Measurement/Reporting of Doppler is only necessary with L1-SINR; Measurement/Reporting of Doppler is only necessary with L3-RSRP; Measurement/Reporting of Doppler is only necessary with L1-RSRP and L1-SINR; Measurement/Reporting of Doppler is only necessary with L1-RSRP and L3-RSRP; and Measurement/Reporting of Doppler is only necessary with L1-SINR and L3-RSRP.

Option 4 (Opt. 4) is that UE reports beams whose Doppler spread is smaller than a pre-defined threshold, $\gamma\_0$.

In Option 4.1 (Opt. 4.1), $\gamma\_0$ is pre-defined in the Spec.

In Option 4.2 (Opt. 4.2), set of possible values for $\gamma\_0$ is specified and using x-bit(s) in DCI or higher-layer signaling, UE is configured with what $\gamma\_0$ value to be used.

Option 5 (Opt. 5) is that instead of Doppler spread, UE may report coherence time associated with each beam. All the above measurement/reporting criteria discussed can be applied for coherence time based reporting as well.

The Doppler spread associated with each beam can be reported in following ways (Opt. 1 and Opt. 2) as below.

Opt. 1: UE reports exact value of measured Doppler spread of a beam; and

Opt. 2: UE reports a n-bit(s) quantized version of the Doppler spread of a beam. FIG. 8 shows a n-bit(s) quantized version of the Doppler spread of a beam.

In Opt. 2.1, n is based on the set of values defined in the in the spec., e.g. Table 5.2.2.2.3-2 in [3].

In Opt. 2.2, there can be multiple tables with different amplitude values specified (For example, Opt. 1 shows one such possible table). Using x-bit(s) in DCI, NW informs UE which table to use or using higher layer signaling, UE is informed which table to use. In Opt. 2.2, n depends on the number of values in the informed table, e.g. if 4 values are in the table, n=2 bits; if 8 values, n=3 bits In Opt. 2.3, UE assumes to be configured a set of tables (as in Opt. 1) by higher layer parameter, and UE assumes which table to use as indicated by x-bit(s) DCI or using higher layer signaling, UE is informed which table to use. In Opt. 2.3, n depends on the number of values in the informed table, e.g. if 4 values are in the table, n=2 bits; if 8, n=3 bits In Opt. 2.4, if any of the above options are not configured, UE assumes Opt. 1.

Coherence time associated with each beam can be reported in following ways, shown Opt. 1 and Opt. 2 as below.

Opt. 1: UE reports exact value of coherence time of a beam; and Opt. 2: UE reports a n-bit(s) quantized version of the coherence time of a beam.

An example is captured in the table shown in FIG. 9. In that n=2 bit(s) quantized version of the coherence time of a beam discussed in Opt. 2 is captured.

In Opt. 2.2, there can be multiple tables with different amplitude values specified (For example, Opt. 1 shows one such possible table). Using x-bit(s) in DCI, NW informs UE which table to use or using higher layer signaling, UE is informed which table to use. In Opt. 2.2, n depends on the number of values in the informed table, e.g. if 4 values are in the table, n=2 bits; if 8 values, n=3 bits.

In Opt. 2.3, UE assumes to be configured a set of tables (as in Opt. 1) by higher layer parameter, and UE assumes which table to use as indicated by x-bit(s) DCI or using higher layer signaling, UE is informed which table to use. In Opt. 2.3, n depends on the number of values in the informed table, e.g. if 4 values are in the table, In Opt. 2.2, =2 bits; if 8, n=3 bits.

In Opt. 2.4, if any of the above options are not configured, UE assumes Opt. 1.

Configuration of BS

Figure 10:
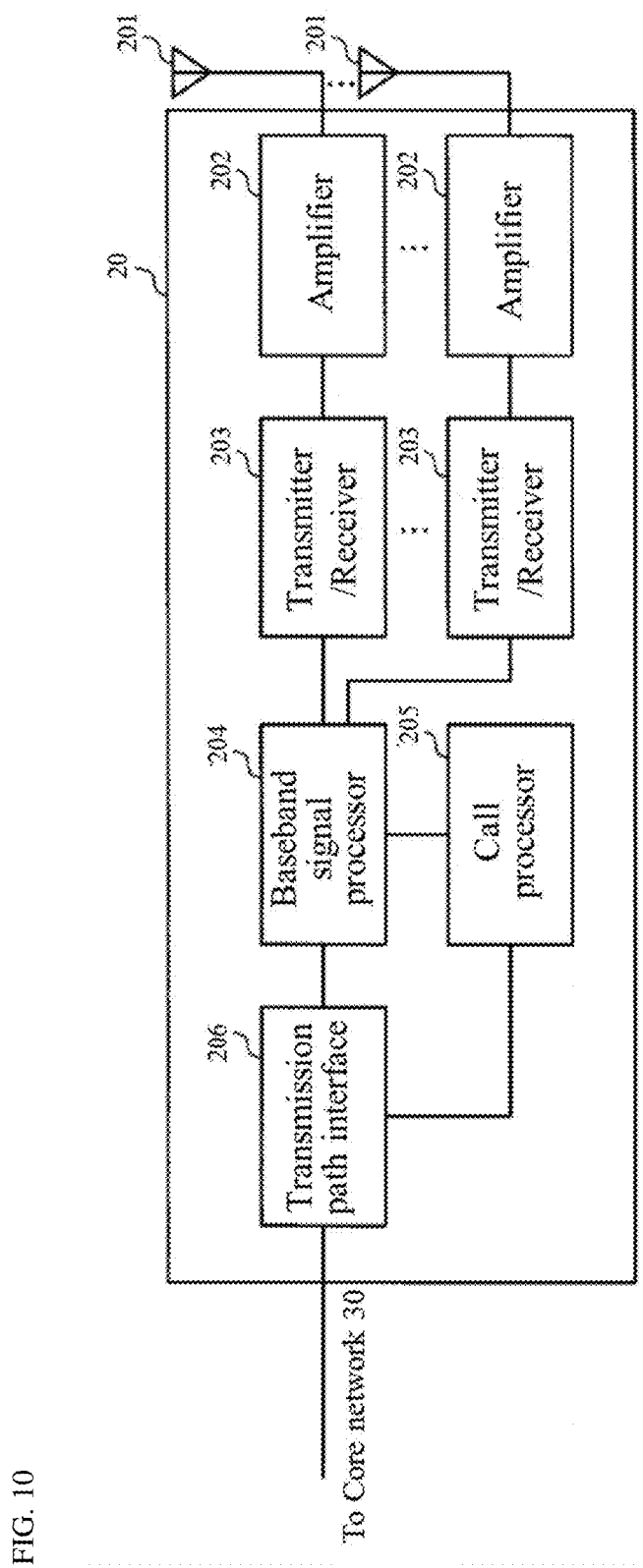
FIG. 10 shows an example of a configuration of a base station according to one or more embodiments.

The BS 20 according to embodiments of the present invention will be described below with reference to FIG. 10. FIG. 10 is a diagram illustrating a schematic configuration of the BS 20 according to embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., Radio Resource Control (RRC) signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network through the transmission path interface 206. The call processor 205 performs call processing such as setting up and releasing a communication channel, manages the state of the BS 20, and manages the radio resources.

Configuration of UE

Figure 11:
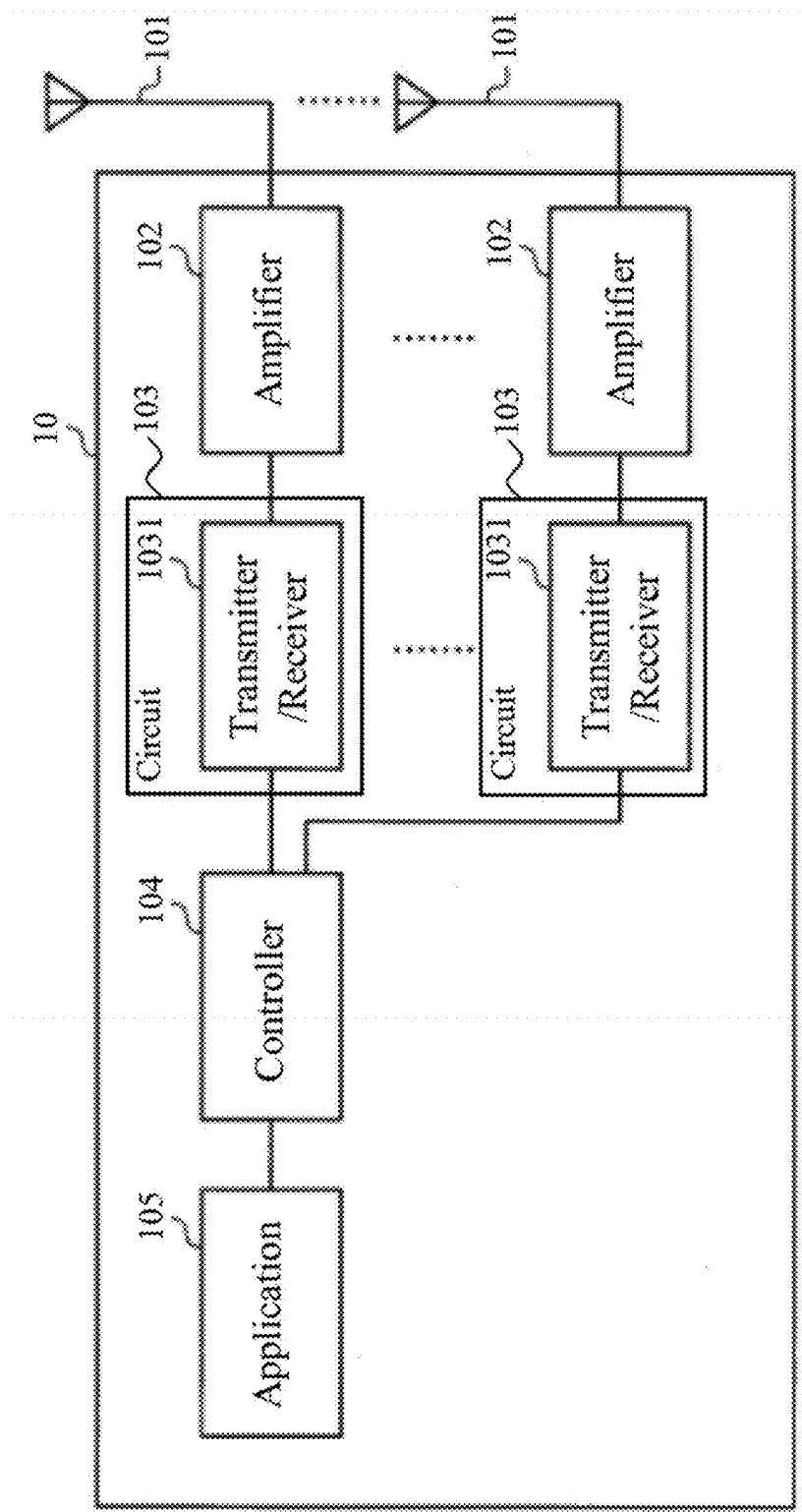
FIG. 11 shows an example of a configuration of a user equipment according to one or more embodiments.

The UE 10 according to embodiments of the present invention will be described below with reference to FIG. 11. FIG. 11 is a schematic configuration of the UE 10 according to embodiments of the present invention. The UE 10 has a plurality of UE antenna S101, amplifiers 102, the circuit 103 comprising transceiver (transmitter/receiver) 1031, the controller 104, and an application 105.

As for DL, radio frequency signals received in the UE antenna S101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

What is claimed is:

1. A terminal comprising:
    a processor that measures for beam management:
        a Doppler spread or a coherence time associated with a beam and one or more reporting quantities; and
    a transceiver that reports the Doppler spread or the coherence time,
    wherein the processor measures the Doppler spread or the coherence time only when a network (NW) activates the processor using Downlink Control Information (DCI) or higher-layer signaling,
    wherein the NW activates, by controlling the processor, whether to measure the Doppler spread, and
    wherein the transceiver reports the Doppler spread when the Doppler spread is smaller than a pre-defined threshold.

2. The terminal according to claim 1, wherein the transceiver always reports the Doppler spread or the coherence time of a beam.

3. The terminal according to claim 1, wherein the processor further measures a Doppler shift of a beam in addition to the Doppler spread, and wherein the transceiver reports the Doppler shift.

4. The terminal according to claim 1, wherein the transceiver reports the Doppler spread or the coherence time only when the NW activates the processor using the DCI or the higher-layer signaling.

5. The terminal according to claim 1, wherein the processor measures the Doppler spread or the coherence time only with one or more given measurement/reporting quantities.

6. The terminal according to claim 1, wherein the transceiver reports a value of the Doppler spread associated with a particular beam.

7. The terminal according to claim 6, wherein the transceiver reports an exact value of the Doppler spread.

8. The terminal according to claim 6, wherein the transceiver reports a quantized value of the Doppler spread.

9. The terminal according to claim 1, wherein the transceiver reports a value of coherence time associated with a particular beam.

10. The terminal according to claim 9, wherein the transceiver reports an exact value of the coherence time.

11. The terminal according to claim 9, wherein the transceiver reports a quantized value of the coherence time.

12. A method for a terminal comprising:
    measuring for beam management:
        a Doppler spread or a coherence time associated with a beam and one or more reporting quantities; and
    reporting the Doppler spread or the coherence time,
    wherein the terminal measures the Doppler spread or the coherence time only when a network (NW) activates the terminal using Downlink Control Information (DCI) or higher-layer signaling,
    wherein the NW activates, by controlling the terminal, whether to measure the Doppler spread, and
    wherein the terminal reports the Doppler spread when the Doppler spread is smaller than a pre-defined threshold.

13. The method according to claim 12, wherein the terminal always reports the Doppler spread or the coherence time of a beam.

14. The method according to claim 12, further comprising: measuring a Doppler shift of a beam in addition to the Doppler spread; and reporting the Doppler shift.

15. The method according to claim 12, wherein the terminal reports the Doppler spread or the coherence time only when the NW activates the terminal using the DCI or the higher-layer signaling.

16. The method according to claim 12, wherein the terminal measures the Doppler spread or the coherence time only with one or more given measurement/reporting quantities.

17. The method according to claim 12, wherein the terminal reports a value of the Doppler spread associated with a particular beam.

18. A base station comprising:
    a processor coupled to a transceiver that receives from a terminal, for beam management, a measured Doppler spread or a coherence time associated with a beam and one or more reporting quantities,
    wherein the Doppler spread or the coherence time is measured only when the base station activates the terminal using Downlink Control Information (DCI) or higher-layer signaling,
    wherein the base station activates whether to measure the Doppler spread, and
    wherein the transceiver receives from the terminal the Doppler spread when the Doppler spread is smaller than a pre-defined threshold.

* * * * *